United States Patent [19]

Donohue et al.

[11] Patent Number: 4,527,252
[45] Date of Patent: Jul. 2, 1985

[54] CHARACTER GENERATOR

[75] Inventors: James M. Donohue, Brighton, N.Y.; Andrew T. Ling, Rancho Palos Verdes, Calif.

[73] Assignee: Xerox Corporation, Stamford, Conn.

[21] Appl. No.: 538,609

[22] Filed: Oct. 3, 1983

Related U.S. Application Data

[62] Division of Ser. No. 270,949, Jun. 5, 1981.

[51] Int. Cl.³ .............................................. G06F 3/12
[52] U.S. Cl. .................................................. 364/900
[58] Field of Search ... 364/200 MS File, 900 MS File; 340/732, 750, 799

[56] References Cited

U.S. PATENT DOCUMENTS

| | | | |
|---|---|---|---|
| 3,872,460 | 3/1975 | Fredrickson et al. | 340/709 X |
| 4,031,519 | 6/1977 | Findley | 364/900 |
| 4,079,458 | 3/1978 | Rider et al. | 364/900 |

Primary Examiner—Thomas M. Heckler
Attorney, Agent, or Firm—Ronald F. Chapuran

[57] ABSTRACT

The present invention is concerned with a character input device, a disc memory, an output marker, and a character generator for converting byte format character information into an output marker bit stream format, and for allocating the converted bit streams onto the disc memory. The stored bit streams can then be retrieved to directly drive the output marker or to be re-allocated onto the disc memory (after merging with presently converted bit streams if appropriate). In another feature of the invention, the converted or generated bit streams are represented in a compressed form (described by a four bit run length code). These bit streams in the compressed form can be merged by the character generator directly into this compressed form without having to first decompress the bit streams, merge, and then compress again. Also printing systems can be configured using one or more character generators committed to one or more disc memories, and in turn, each disc memory can drive one or more printers.

14 Claims, 8 Drawing Figures

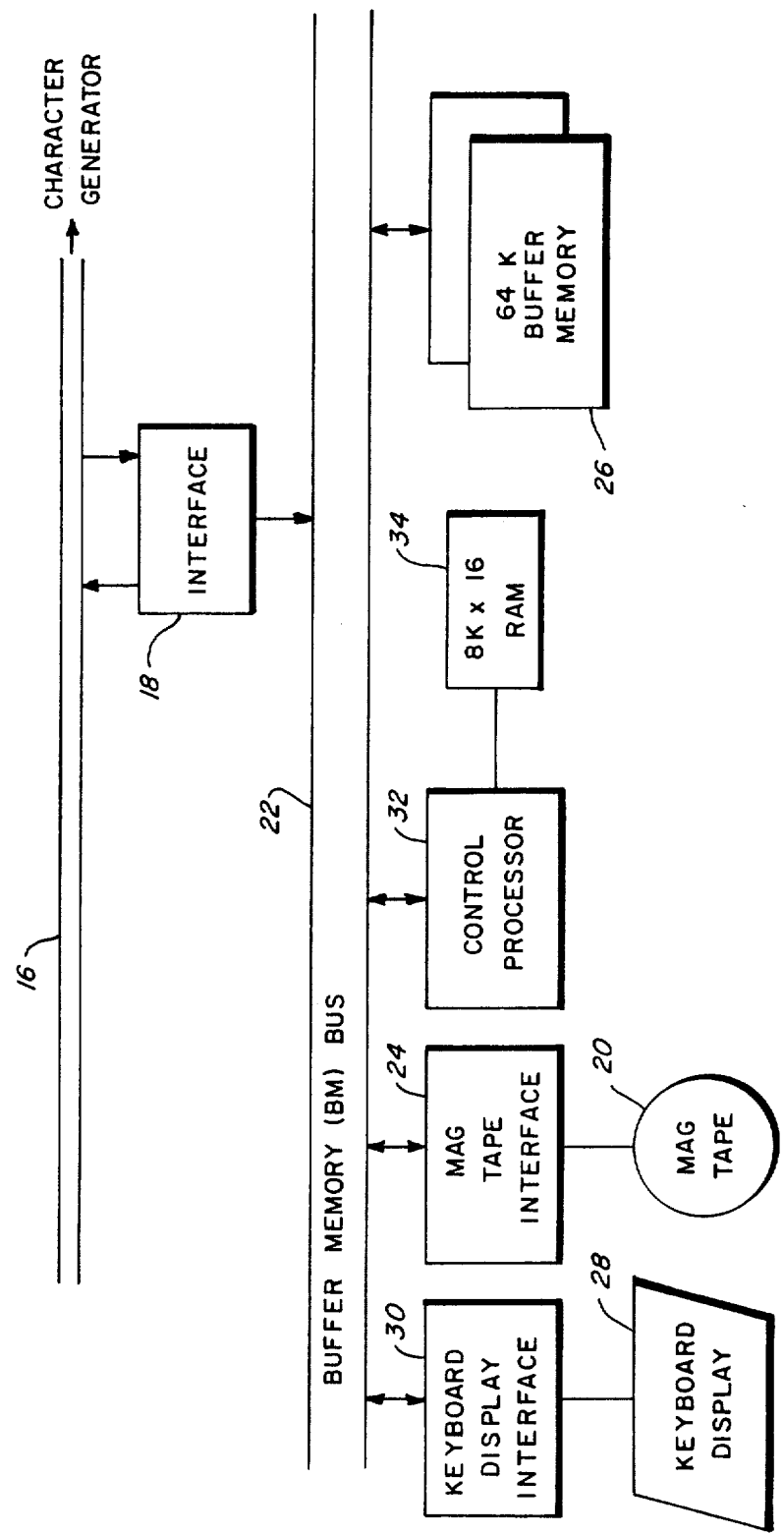

CHARACTER GENERATOR

This is a division of application Ser. No. 270,949, filed June 5, 1981.

The present invention relates to a printing system for converting character coded data into bit streams and for allocating converted (generated) bit streams onto a disc memory, in particular, for later retrieval of the bit streams from the memory to directly drive an output marker, for retrieval to merge the bit streams with presently converted bit streams to drive an output marker, or for retrieval of the bit streams to be merged with presently converted bit streams for allocation onto the disc memory for driving an output marker at a later time.

In prior art printing systems, such as the Xerox 9700 Laser Printer, it is common to store character coded binary information in a memory such as a disc. A character generator then converts the character coded information (one byte per character), into binary information (bit streams) suitable for driving an output marker such as a laser to print the character information. A difficulty with this type of system, is that the character generator is on line, and the character generator must be geared or sized to peak demand. In addition, full pages or multiple pages cannot be completely generated before the output marker is committed to print.

It would be desirable, therefore, to provide a character generator that can be sized to the average demand rather than the peak demand. It would also be desirable to provide a character generator that can convert the character coded information into bit streams and can allocate the converted bit streams to a disc rather than directly to the output marker, permitting full pages, dense or complex pages, or sets of pages to be completely generated before the marker is committed to print them. In other words, it would be desirable to provide a character generator that can store converted (generated) bit streams for later retrieval to directly drive an output marker, for later retrieval to merge the converted bit streams with presently converted bit streams to immediately drive an output marker, or for later retrieval to be merged with presently converted bit streams for allocation onto the disc for driving an output marker at a later time.

It would also be desirable to provide a character generator that can directly merge bit streams in compressed format without having to first decompress the bit streams, merge, and then compress again. In addition, it would also be desirable to provide a printing system wherein one or more character generators can be allocated to one or more disc memories and each disc memory can be allocated to one or more printers.

Therefore, an object of the present invention to provide a new and improved printing system that is flexible, that can operate off-line or on-line, that can allocate converted bit streams onto a disc memory, and that can retrieve the converted bit streams to directly drive an output marker or to merge with presently converted bit streams. Another object of the present invention is to provide a character generator that can process very dense or complex pages as several component pages merged together in successive passes and that can treat overlay text, forms and images that are preprocessed and stored on disc as component pages to be merged with current variable text. Another object of the present invention is to provide a character generator that can directly merge compressed bit streams into compressed format.

Further advantages of the present invention will become apparent as the following description proceeds, and the features characterizing the invention will be pointed out with particularity in the claims annexed to and forming a part of this specification.

Briefly, the present invention is concerned with a character input device, a disc memory, an output marker, and a character generator for converting byte format character information into an output marker bit stream format, and for allocating the converted bit streams onto the disc memory. The stored bit streams can then be retrieved to directly drive the output marker or to be re-allocated onto the disc memory (after merging with presently converted bit streams if appropriate) for driving the output marker at a later time. In another feature of the invention, the converted or generated bit streams are represented in a compressed form (described by a four bit run length code). These bit streams in the compressed form can be merged by the character generator directly into compressed form without having to first decompress the bit streams, merge, and then compress again. Also printing systems can be configured using one or more character generators committed to one or more disc memories, and in turn, each disc memory can drive one or more printers.

BRIEF DESCRIPTION OF THE DRAWINGS

Other objects and advantages of the present invention will become apparent upon reading the following detailed description and upon reference to the drawings wherein the same reference numerals have been applied to like parts and wherein:

FIG. 2 is a block diagram of the character input element of FIG. 1;

With reference to FIG. 1, there is shown a generalized block diagram of a printing system including a character or information input element 10, a character generator 12, and a configured printer connected to communication channel 16. As will be illustrated in more detail, the input source to the printing system can be via the communication channel 16 or via an input scanner provided as an integral part of the printer 14. The output of printing system can be the communication channel 16 or an output marker provided as an integral part of the printer 14.

With reference to FIG. 2, the information input element 10 is interconnected to the communication channel 16 through an input element interface 18. Preferably, the information input element 10 includes a mag tape 20 or any other suitable non-volatile storage media connected to buffer memory bus 22 through suitable interface 24. The mag tape interface 24 consists of the logic and circuits to operate the mag tape, accept the formatted data and to load the data to the serial/parallel 64K buffer memory 26. The buffer memory 26 provides short term storage for input/output and data manipulation.

Figure 1:
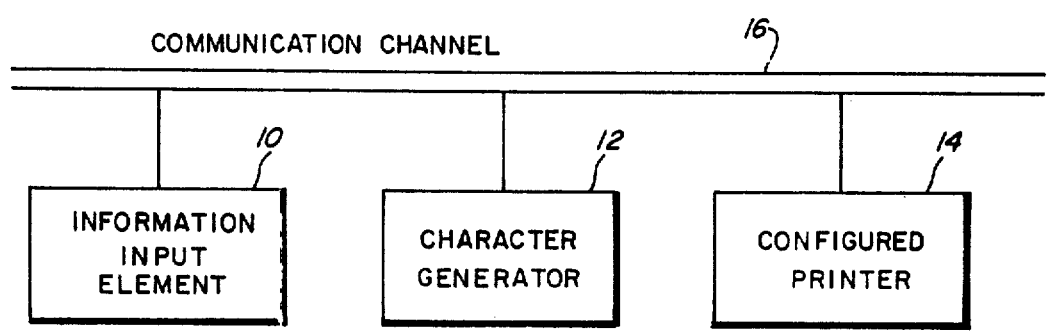
FIG. 1 is a general block diagram of the printer system incorporating the present invention.

A keyboard/display unit 28 is also connected to bus 22 via a keyboard/display interface 30. The keyboard/display interface 30 consists of logic and circuitry to maintain communication with an operator and to receive and present data. The information input element control processor 32 with related 8K×16 RAM 34 provides the processing intelligence, timing, and control sequences. The information input element 10 accepts coded input data from an input source, converts the data to suitable codes and creates appropriate packets of information to be forwarded to the character generator 12.

Figure 3:
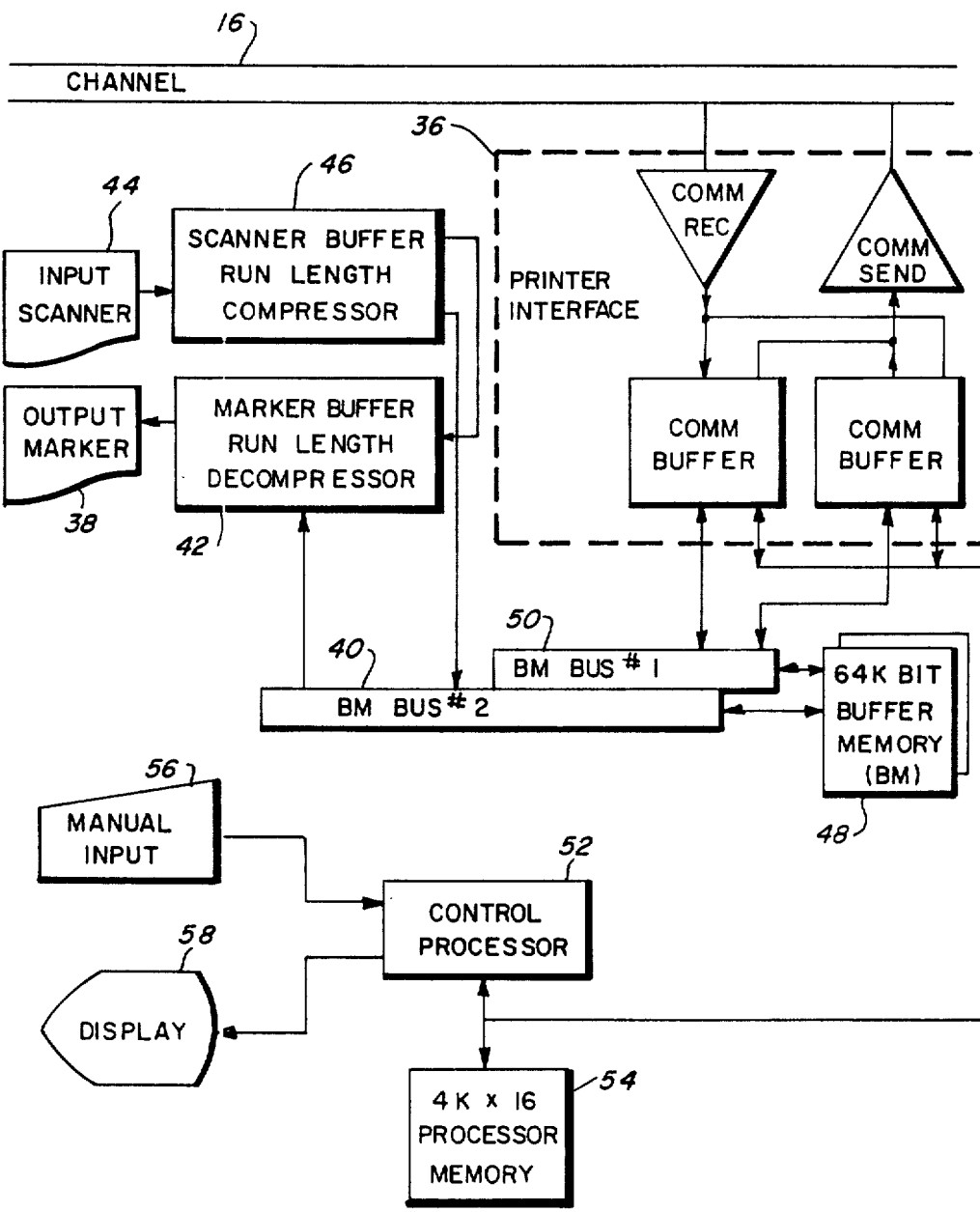
FIG. 3 is a block diagram of the printing system of FIG. 1.

In a sample embodiment with reference to FIG. 3, a configured printer 14 is connected to channel 16 via printer interface 36. An input scanner 44 for scanned forms input operations is connected to the memory bus 40 through a scanner buffer run length compressor 46. Preferably, the input scanner 44 covers a 9"×14" raster scan at 480 lines per inch resolution. Scanning is assumed along the 14" side while documents are fed along the 9" side (landscape feed). An output marker 38, for example, a laser device, is connected to buffer memory bus 40 through a marker buffer run length decompressor 42. The output marker covers a 9"×14" raster scan area at 480 lines per inch resolution. It should be understood, however, that many other suitable scanner and output markers are contemplated with various degrees of resolution. The output scanning is synchronous with the input scanning or is controlled by format information derived from the received digital data stream. Scanning is also in the landscape feed format. The memory bus 40 connects to a 64K bit buffer memory 48 and the memory 48 is also connected to the printer interface 36 via buffer memory bus 50.

The configured printer 14 also includes a control processor 52 with 4K×16 memory 54 connected to a manual input 56, a display 58, and the printer interface 36. It should be noted that the configured printer 14 may include one or more of the printers illustrated in FIG. 3 and that there may be variations of the printer illustrated in FIG. 3. For example, if the printer is to serve only a digital printing function, the input scanner 44 and associated compressor 46 can be eliminated.

Figure 4:
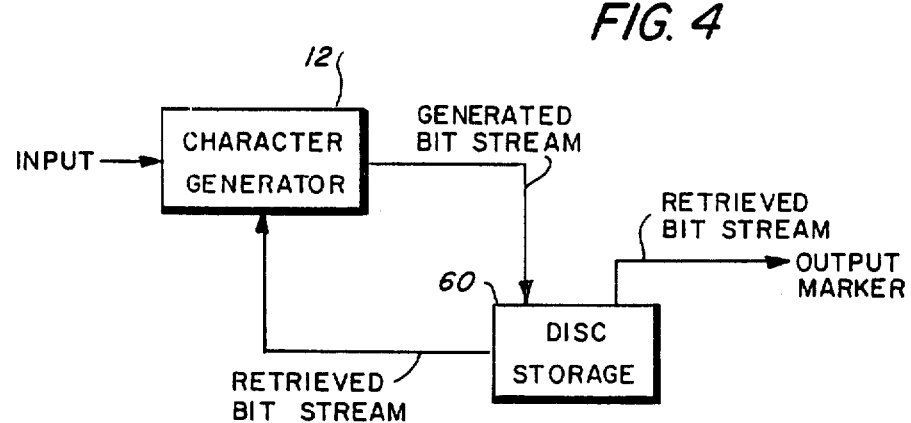
FIG. 4 is a general block diagram showing the information flow in accordance with the present invention.

The character generator 12 as shown in FIGS. 1 and 4, in accordance with the present invention, accepts the input information in the coded character text line form generated by data processing systems or from other systems such as word processing and optical character recognition. It converts these documents to a raster form and forwards these raster documents to the configured printer 14.

In a particular, information enters in the form of character coded tapes, directly from a computer, a modem or any other communication interface. It is reformatted by the information input element 10 and forwarded to the character generator 12. The character generator 12 builds imaginal pages (blocks of data bits for directly modulating a raster scanning element such as a laser to reproduce the input information). These blocks of data bits are stored upon the character generators associated disc memory 60 or forwarded directly to the printer 14. The printer 14 receives the imaginal pages as if they came from a typical scanner and prints them in the normal fashion. The character generator 12 in general performs several functions. For example, it takes simple graphics or page form description, either in coded data or in system standard coded compressed raster bit streams, pre-processes the forms into appropriate run-length coded raster bit streams, and stores them in disc memory for later page formatting use.

It also takes textual information in coded characters communication (orthographical) from a source on channel 16 and accumulates them as a document in its disc memory 60. In addition, it transforms the textual information of a document thus stored in the disc memory into formatted pages of images of appropriately coded, compressed raster bit streams. Features of the transformation include multiple fonts on a page, proportional character spacing, and forms merging. The compressed font images are previously stored in the disc storage. The character generator 12 transmits the transformed pages, one at a time, via channel 16 to the printer 14 for multiple copy printing.

In particular, with reference to FIG. 4, the character generator 12 converts the character coded input information into bit streams (referred to as converted or generated bit streams). In general, the input to the character generator 12 can be via a communication interface or via an input scanner. These generated bit streams are allocated onto the disc memory 60, as illustrated by the arrow in FIG. 4. The generated bit streams can then be retrieved from the disc memory 60 (retrieved bit stream) and immediately conveyed to an output device. In general, the output can be a communication interface or an output marker such as configured printer 14.

The generated bit streams can also be retrieved by the character generator 12 to be merged with bit streams that are currently or presently being converted within character generator 12.

It should be understood, however, that merging could also include two imaginal files or merging a file with formatting information such as a half tone dot format. For example, information such as overlay text, forms, or images that has already been preprocessed and stored on the disc memory 60 as component pages can be merged with information being converted by the character generator 12 in the current pass or conversion. It should be noted that currently converted bit streams means bit streams that are being converted in the character generator and not yet stored on the disc memory 60.

These merged bit streams can then be allocated onto the disc to be retrieved to immediately drive an output marker. Alternatively, the merged bit streams can be stored onto the disc for use at a later time. It should be noted that pages or blocks of information can be partially processed and the bit streams stored on the disc in either a compressed or non-compressed mode. This information can then be merged with additional page information and likewise stored in either compressed or non-compressed mode. This process can be repeated by several iterative passes to store several sections or whole pages.

Figure 5:
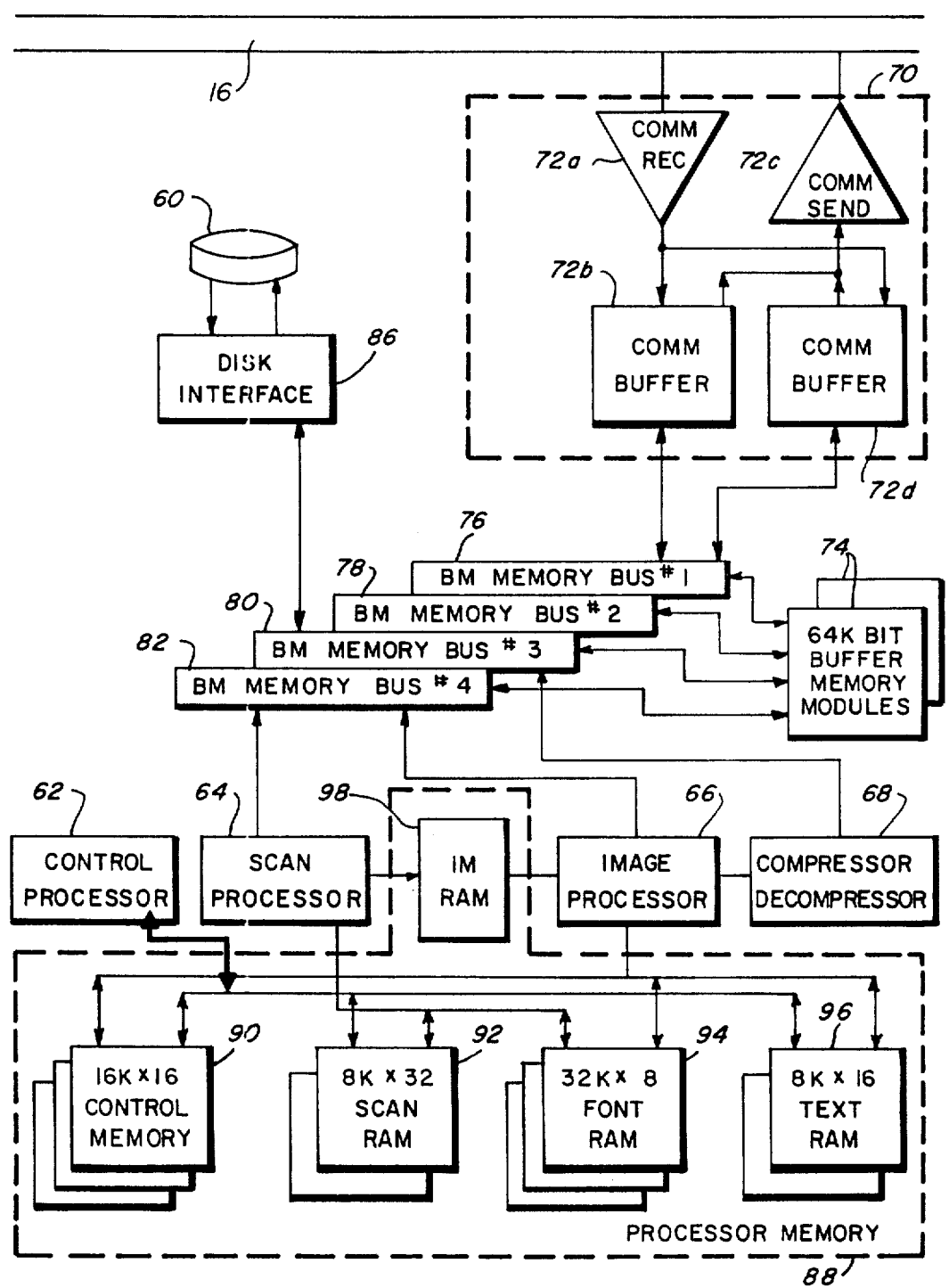
FIG. 5 is a block diagram of the character generator shown in FIG. 4 in accordance with the present invention.

FIG. 5 shows the character generator 12 in more detail. In a specific embodiment, three processors are used. In particular, a control processor 62 accepts page information from the information input element 10 and sorts it into the proper order for conversion from the character code to the raster scan code. The control processor 62 is the master processor controlling general housekeeping, resource management and allocation including disc space, communication channel scheduling and control, document processing scheduling and task creation, page text list processing including font collection and scan line list (SLL) control.

A scan processor 64 is configured to transform the textual data of each scan line list forwarded by the control processor 62 into run length coded field streams (RFS). An image or merge processor 66 merges forms as overlays (not handled by the control processor 62 as part of the scan line list) and run length coded field streams with the test bit streams created by the scan processor 64. In short, the image or merge processor 66 combines raster forms and raster text or sections of dense pages with prior sections to form output pages compatible with the printer 14. The combined bit stream is then passed on to the compressor/decompressor 68.

The compressor consists of a two line maximum likelihood prediction, run length encoding and error propagation control logic. The prediction and run length encoding are performed on a line by line basis. The compressor 68 is responsible for converting the run length coded bit stream into the system standard coded run length/delta compression bit stream or any other suitable compressed bit stream, and loading the resulting data into an assigned memory module 74 under control of the image or merge processor 66.

The character generator 12 of FIG. 5 is shown connected to communication channel 16 preferably a 15 megabit per second bandwidth channel through a generator interface 70. The generator interface 70 includes the necessary communication circuitry to allow data transfer between the character generator 12 and the communication channel 16 including receive circuitry 72a with buffer 72b and send circuitry 72c with buffer 72d.

In a sample embodiment, each of the buffers 72b and 72d is a 5K bit RAM capable of operating at a 120 mega byte per second rate. It has the logic to interrupt the control processor 62 for service and to exchange data with memory modules 74 assigned by the control processor. There are two buffers 72b and 72d for alternate exchange and communication operations. Information transmission on the communication channel 16 is by packets. A packet is logically formatted data bits contained between a header and trailer. For data packets, the header and trailers are processed by the control processor while the data (up to 4K bit blocks) is exchanged with memory modules 74. Control packets are entirely processed by the control processor 62.

Preferably, the character generator 12 includes 64K bit buffer memory modules 74 connected to four memory buses 76, 78, 80 and 82. The buffer memory modules 74 are the intermediate information buffer between the disc memory 60 and other elements in the system. It is organized in 64K bit modules. A module consists of storage for the 64K bit data plus appropriate error correcting code bits, storage timing, drive circuitry, addressing logic, and memory bus connection logic.

Each buffer memory module 74 is a self-contained operating unit, dynamically assigned or switched by the control processor 62 to operate with one of the four memory buses. Data timing is synchronized with the current user element's operation timing. The assignment stays with the user element until terminated by the user or because the appropriate amount of data has been exchanged. Upon termination, the control processor 62 is notified immediately via a program interrupt. If processing or transforming operations are to be done by the processors, the information in the memory module 74 is generally first transferred to RAM in the processor memory, before processing or transforming operations by the processors.

The memory module 74 data transfer bandwidth is capable of 60 mega bits per second (Mbps) rate. The transfer block size is nominally in 4K bits or more. Each of the memory buses 76, 78, 80 and 82 is an access port by other system elements while sharing that port with buffer memory modules.

The buffer memory consists of memory module address, control signals, coders for generating error checking codes, decoders for error detection, and interface logic to memory modules. The disc memory 60 having a capacity of approximately 800 megabits is connected through a disc interface 86 to memory bus 80. The disc 60 is preferably a 4-head parallel read/write configuration. This configuration of the disc unit consists of three platters having a net capacity of approximately 800 Mb. The disc interface 86 controls disc operation, and manages data transfer to and from the memory modules 74 selected by the control processor 62.

The processor memory 88 as shown within the dotted lines includes a $16K \times 16$ control memory 90, an $8K \times 32$ scan RAM 92, a $32K \times 8$ font RAM 94, an $8K \times 16$ text RAM 96, and an image RAM 98. The processor memory 88 is the control and/or working memory for the processors. It is organized in a structure of $4K \times 32$ bit word RAM modules. Each RAM module consists of the 128K bit data storage, plus appropriate error connecting code bits, timing and drive circuit, addressing logic and connection logic to two user access ports.

The processor memory modules are organized to respond to the 64K word addressing space of the processors. If there are more than one processor and more than 64K words of processor memory, each processor will have some private RAM modules and shared RAM modules with another processor. Each RAM module is conversely accessible by the two processors. In this configuration, the total processor memory requirement is estimated at 64K words. To keep up with the processing bandwidth requirements of the processors, with minimum interference, memory modules are allocated such that a RAM module is predominantely accessed by only one processor at a time in the course of processing data.

In accordance with another feature of the present invention, an x bit by y bit font character image is described in a list of run length 4 bit coded field strings (RFS), each field representing a sequence of ones or zeros. Each string starts with a length field for a given or defined polarity. Each subsequent length field alternates representing zeros and ones unless a control or end code is encountered in the field. This description covers the active zone of the variable size (both in height and width) character.

In a specific embodiment, a 4 bit field was used as follows

0000 Control Code
0001
0010
0011

0100
0101
0110
0111 1 to 13 length
1000
1001
1010
1011
1100
1101
1110 Extension Code
1111 End Code The control code (0000) is interpreted as follows:

1. If followed by a length field (such as 0001, or 1110), the length field indicated length for a field regardless of current polarity.
2. If followed by an End Code (1111), the rest of the scan line should be filled with zeros.
3. If followed by another Control Code (0000), interpret the next field for up to 16 control functions. (Any length field thereafter corresponds to the current polarity.)
4. A control code following an End Code denotes the end of the font RFS only.

The End Code (1111) indicates the end of the current font scan line. (All unused fields after the End Code for the rest of word should be filled with End Codes.) The Extension Code (1110) in interpreted as a length extension of the current polarity. It means that 13 is to be added to the length value of the next field, keeping the current polarity. The extension code (1110) can be chained one after another for as long as needed. The interpretation of the RFS fields is the same for the scan lines of a transformed page. Thus, a blank line is represented by a control code (0000) followed by an End Code (1111) in the RFS.

It should be understood that the above choice of field size and coding could be optimized with more study on the various types of fonts. There are four such 4 bit fields to each 16 bit word. The first bit of each scan starts at a reference position. The first field of each scan line RFS represents a string of ones, unless it is a control code. Each scan line starts at the beginning field of a half-word. The unused field of the last half-word of a scan line is filled with end code.

Font descriptions are previously stored in the character generator disc memory 60. It is assured that each font is described in two scan directions—short-side or portrait scan direction and long-side or landscape scan direction—to be selected for portrait or landscape mode of operation. Composite font can be dynamically generated by the control processor 62 (with the help of image processor 66) and sorted as special font for later use. Overlapping graphics or characters, when used repeatedly, can be handled in this manner. Forms and graphics are assumed to be previously described in the RFS format and stored in the disc memory.

For certain types of forms and graphics, they can be treated as if they are a special character font, described in exactly the same way as the text character fonts. In these cases, the form characters or graphics characteristics are added into the scan line list (SLL) by the control processor 62. They are processed by the scan processor 64 along with the text character in the list. Other types of forms and graphics (complex images) that cannot be treated as special character fonts will be treated as a complete page overlay. Such overlays will be stored in RFS format on the disc memory 60. The RFS description of the overlay page is loaded into assigned memory modules 74 by the control processor 62.

The image processor 66 will read the overlay RFS from the memory module 74 and merge it with the text RFS generated by the scan processor 64 in the image RAM 98. The merged RFS is then fed to the compressor 68 for transformation into the system standard coded raster bit stream for transmission to the printer 14 via the channel 16.

The image processor 66 merge operation is done by processing the two RFS in parallel, while keeping track of the scan line position, in the RFS format. It is assumed that the complete overlay RFS description can be contained by a reasonable number of memory modules 74. While this is true, overlay merging has no effect on the transformation speed. Otherwise, successive segments of the form overlay description have to be accessed from the disc memory 60 and transformation speed may degrade.

Figure 6:
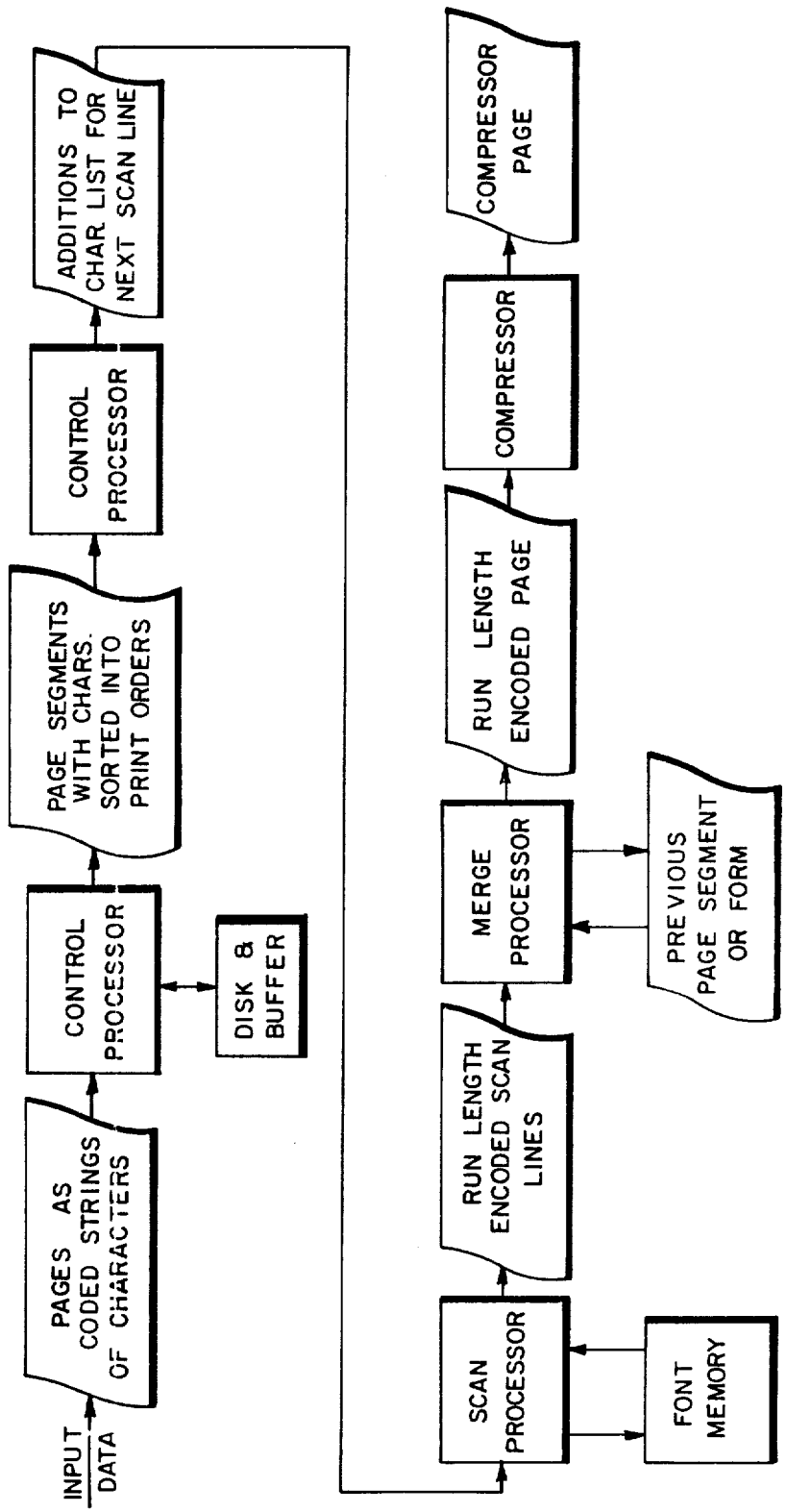
FIG. 6 is a general flow chart showing the character generation process in accordance with the present invention.
Figure 7:
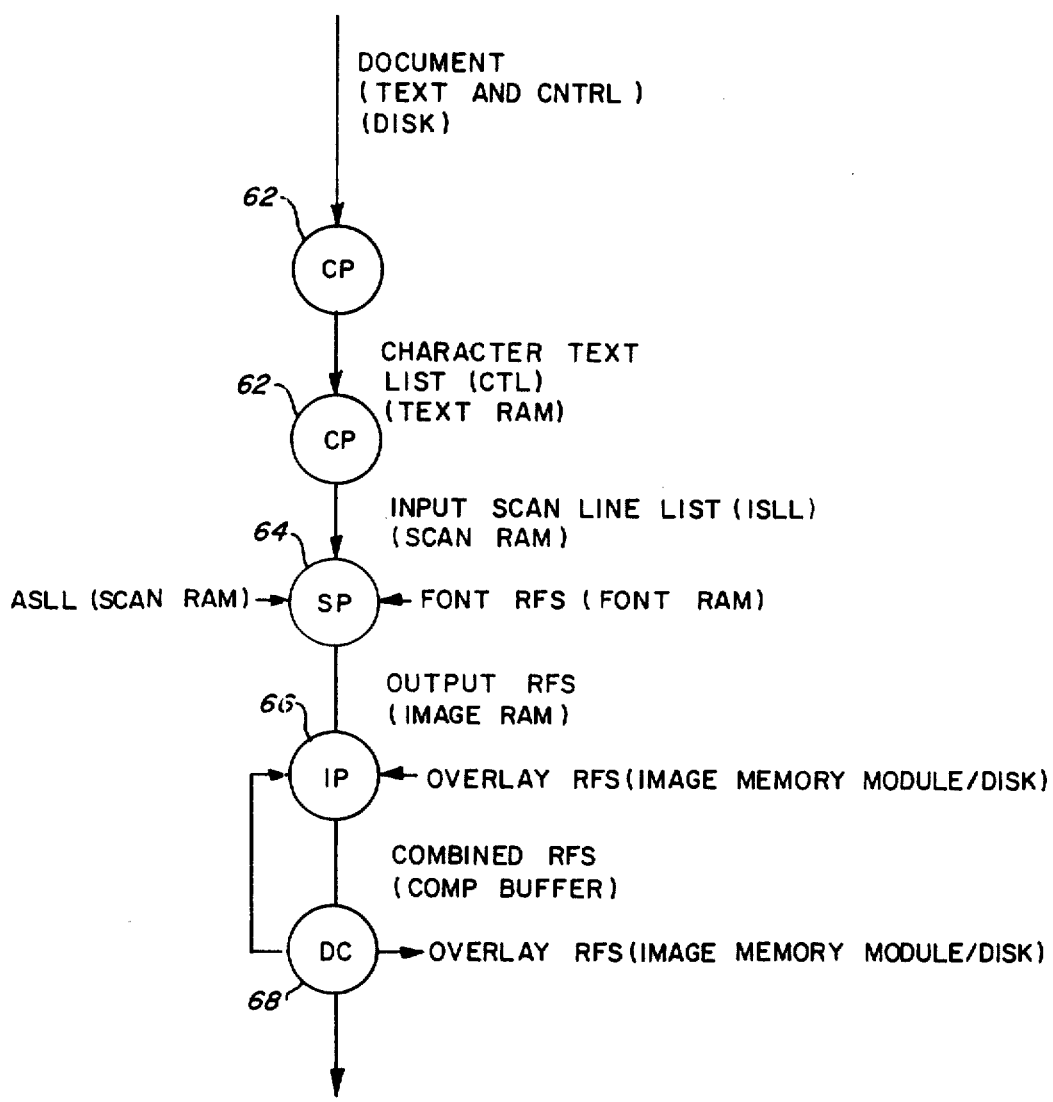
FIG. 7 is a flow chart illustrating the character generating process.

The document conversion process is best illustrated with respect to FIGS. 6 and 7. The content of the document is assumed to have been generated from another source on the communication channel 16. The information input element 10 has obtained the document directly from either a host computer on-line or from a magnetic tape or other suitable device controlled by a computer (off-line).

The document description is previously transmitted and stored in the character generator disc memory 60. The document content is assumed to be a line by line format with control characters indicating a selection of fonts, forms, and graphic addition. The content description is translated by the input element 10 from the host computer description to one that is understood by the character generator 12.

A character text to page image transformation by the three processors 62, 64 and 66 in the character generator 12 is then performed in the following sequence in accordance with the present invention.

Step 1. The document text is conveyed to the text RAM 96 and processed by the control processor 62. In particular a page (approximately 2000 characters) is extracted and listed in a character text list (CTL) in the text RAM 96. Each character in the CTL is described in four sixteen bit words containing the following information:

a. Controls—character code, font selection, scan offset from reference, and orientation.
b. X direction position of the character reference point.
c. Y direction position of the character reference point.
d. font character starting word address in the font RAM 94.

The character text list typically has 2K entries in the text RAM. Pages of more than 2K characters are processed in 2K character segments.

There are at least two ways to process pages with more than 2K characters. In one embodiment, it is possible to pick a convenient segment of up to 2K random characters from the character text list (CTL). A complete run length coded field stream (RFS) overlay page is created into a serial parallel memory module 74 in the first pass. A second segment of 2K characters is then processed and merged with the overlay from the first pass into a new overlay. Thus, subsequent passes of 2K characters are merged with the overlay of the proceeding pass until all the characters of the page are processed and merged. This method requires as may 2K character passes as the number of 2K segments.

In another embodiment, it is possible to presort the complete page by sorting it into vertical (scan direction) strips of 2K character segments and storing them onto the disc memory 60 or a memory module 74. Successive strips are called in and processed in a continuous pass, starting from the left side of the page. This method takes only one long pass processing n by 2K characters. In general, the processing time is related to the number of characters on a page. It should be noted that the 2K threshhold is an arbitrary number. It should also be noted that only those fonts required by the CTL need to be in the font RAM 94 when a page is processed in segments.

Step 2. The character text list (CTL) is next processed by the control processor 62 to extract those characters that are actively involved in the current scan and form an input scan line list (ISLL) in the scan RAM 92. Assuming the scan is in the Y direction, the current scan is the Xth line across the page. Using a portrait page, the Y direction is along the long side, for example, from bottom to top and the X direction is along the short side, for example, from left to right.

The first ISLL would contain characters from the left verticle strip of the page for a certain number of scan lines in the X direction. Each character in the ISLL is described by three 16 bit words as follows:

1. Current font RFS starting word address. Note that the width of the character as well as the end of each scan line are denoted in the RFS itself (16 bits).

2. Y direction position of the character reference point (13 bits).

3. X direction position of the character reference point at which the character should become actively processed. The character entries in the ISLL must be sorted by the control processor 62 in proper order. Namely, the characters to be processed by the scan processor 64 for any line must be in ascending Y starting position order and new characters starting at later than the Xth line must be in ascending X starting positions of successive segments of adjacent characters. The ISLL is self-terminated by an entry in which the font RFS address is all zeros.

Step 3. The ISLL is passed on by the control processor to the scan processor 64 for RFS generation. The scan processor keeps an alternating active scan line list (ASLL) in scan RAM 92. Each character in the active scan list (ASLL) is described by a double 16 bit word as follows:

1. Y starting position reference (13 bit)

2. Current font RFS starting word address (being updated for each Xth scan line) 16 Bits. Note that the width of the character as well as the end of each scan RFS, are denoted in the RFS content of the font.

The scan processor processes each character entry from the current ASLL and stores the updated entry of the same character in the alternative ASLL in succession. However, if the character font terminates (denoted by an end code 1111 followed by a control code 0000), the entry is not stored thereby removing it from the ASLL.

During the processing, the current X position is compared with the X starting position of the next character of the ISLL to anticipate a new character starting in the next scan line. In that case, the ISLL character entry is stored into the ASLL. Thus, the alternate ASLL is updated with the proper character sequence for the next scan line. At the end of each scan line (terminated by an entry with the font RFS being all zeros), the alternate ASLL and the current ASLL are exchanged.

RFS generation is a simple iteration process for each character entry in the ASLL done in the scan processor as follows:

1. The current Y position is subtracted from the character Y starting position. If the result is negative, this character overlaps with the last character. The result normally is expected to be zero or positive. An appropriate number of zeros, in RFS fields, is appended to the output RFS.

2. The font RFS of the character is then processed and appended to the output RFS one field at a time until an end code is detected. As this is done, the current Y position is advanced.

3. The font RFS address is updated before storing the two word entry in the alternate ASLL.

4. The next entry in the ASLL is accessed to repeat from Step 1. If the new entry access contains zeros as the font RFS address, the end of the ASLL is reached and an appropriate end code is appended, and the RFS generation of the current scan line is complete.

When the RFS register has accumulated two 16 bit words of RFS, the two words are stored in the image RAM 98. These two words are stored using the current output RFS address. Note that for a faster version, the image RAM 98 could be structured as an FIFO store.

Step 4. The RFS in the image RAM 98 ( or in the FIFO store) is passed on to the image processor 66 for merging with any required overlay and for conversion into appropriate standard data compaction codes by the compressor 68. The final output is stored into its assigned buffer memory module 74. When a buffer memory module 74 is filled up, the control processor 62 is notified via a buffer memory program interrupt. The control processor will then assign a new buffer memory module to the image processor. The control processor will also route the filled buffer memory module 74 to the next appropriate operation; namely, transmission to the printer 14, via the communication channel 16 for printing.

In accordance with the present invention, the merging process of two RFS's into one output RFS in a compressed form is done by the image processor 66. Starting from the beginning of the two RFS's, the current field of one is compared with that of the other in the following manner:

Case 00/11—Namely, both fields are denoting the same polarity:

The shorter field value with the appropriate polarity is passed onto the output RFS. The RFS having the shorter field value advances to the next field, with appropriate polarity updated. The other RFS is not advanced by its field value and decreased by the shorter field value. In case that the two field values are equal, both RFS's advance.

Case 10/01—Namely, the two fields are denoting opposite polarities:

The shorter field value is passed onto the output RFS with a 1 polarity. The RFS having the shorter field value advances to the next field, with appropriate polarity updated. The other RFS is not advanced but its field value is decreased by the shorter field value. In case that the two field values are equal, both RFS's advance.

The above Steps 1 to 4 repeat in this pipeline processing fashion for each 2K segment of the page until the complete page is transformed and until the complete document is transformed.

Figure 8:
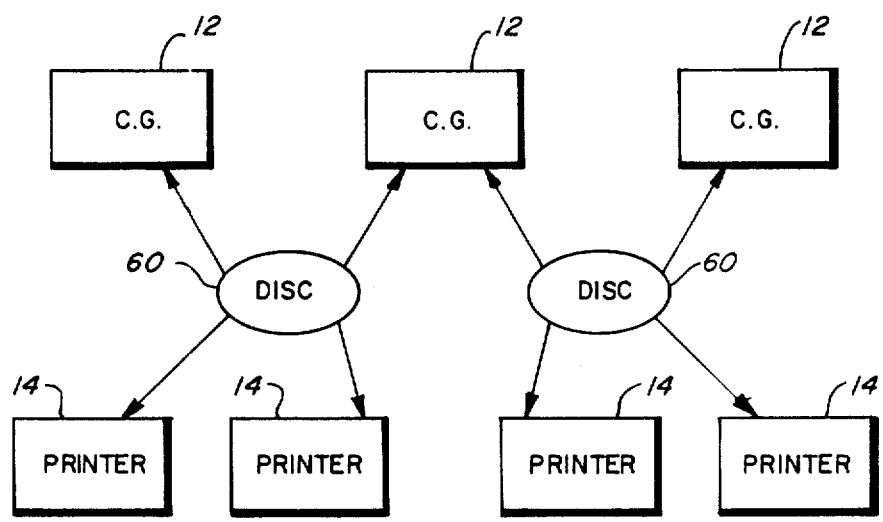
FIG. 8 illustrates a printing system comprising a plurality of interconnected printers, discs, and character generators in accordance with the present invention.

With reference to FIG. 8, there is shown an exemplary multiple printing system in accordance with the present invention. A plurality of printers 14 are driven by a pair of disc memories 60. The disc memories 60 are connected to a plurality of character generators 12. Generation of characters onto the disc memories permits complete pages or page sets to be generated before any printer is committed to reproduce the pages of text. It should be noted that many other system configurations are possible but in particular the character generators can be off line to convert the input character into raster scan format and can allocate the converted characters onto the disc for directly driving the printer or for retrieval and merging with current converted characters.

While there has been illustrated and described what is at present considered to be a preferred embodiment of the present invention, it will be appreciated that numerous changes and modifications are likely to occur to those skilled in the art, and it is intended in the appended claims to cover all those changes and modifications falling within the true spirit and scope of the present invention.

We claim:

1. The method of operating a character generator having a processor and a memory for driving an output marker in a printing system comprising the steps of
   (a) converting character coded input data into bit streams in the processor,
   (b) allocating the converted bit streams onto the memory,
   (c) retrieving the converted bit streams from the memory,
   (d) merging in the processor the retrieved bit streams with other bit streams currently converted in the processor,
   (e) allocating the merged bit streams back onto the memory, and
   (f) retrieving the merged bit streams from the memory to drive the output marker.

2. The method of claim 1 including the step of leaving the merged bit streams in memory for later use.

3. The method of claim 1 wherein the step of merging the retrieved bit streams with other currently converted bit streams includes the step of compressing both bit streams into compressed format.

4. The method of claim 3 including the step of merging the retrieved and currently converted bit streams into compressed format whereby it is not necessary to first decompress the retrieved and currently converted bit streams before merging.

5. In a printing system having a character generator including a processor for converting character coded data into bit streams and for allocating the converted bit streams onto a memory, the method of operating the character generator including the steps of
   allocating the converted bit streams onto the memory in compressed format
   retrieving the bit streams in compressed format from the memory
   merging the retrieved bit streams in the processor with other converted bit streams in compressed format into a merged bit stream in compressed format.

6. The method of claim 5 including the step of allocating the merged bit stream in compressed format onto the memory.

7. The method of claim 6 including the step of retrieving the merged bit stream from memory for driving an output marker.

8. In a printing system having byte character input data, a control processor, a disc memory, a buffer memory, a scan processor with a font memory, a merge processor, and a compressor, the method of converting the byte character data input into raster scanning format including the steps of:
   receiving the input data as coded streams of characters into the control processor,
   converting the coded streams of characters into page segments with characters sorted into print order,
   operating on the page segments by the scan processor to provide run length and coded scan lines, and
   operating on the run length and coded scan lines by the merge processor to provide a run length encoded page.

9. The method of claim 8 including the step of compressing the run length encoded pages into a compressed page.

10. The method of claim 9 including the step of retrieving the compressed page to drive the output marker.

11. In a printing system having an information input device, an output marker, a disc memory and character generator, including a buffer memory, a text memory, a scan memory, an image memory, a control processor, a scan processor and an image processor, the method of converting character byte information into raster scanning format for storage on the disc memory, the method comprising the steps of
   extracting a group of characters from the information input device,
   listing the characters in a character text list (CTL) in the text memory,
   operating on the character text list by the control processor to extract those characters actively involved in a current scan,
   forming an input scan line list (ISLL) in the scan memory,
   operating on the input scan line list by the scan processor,
   keeping alternating scan line lists in the scan memory,
   generating run length field streams (RFS) for storage in the image memory,
   operating on the run length field streams (RFS) by the image processor for conversion into data compaction codes and storing into the buffer memory.

12. The method of claim 11 including the step of merging two run length field streams into one output run length field stream.

13. The method of claim 11 including the step of routing by the control processor of the stored run length field streams (RFS) to a communication interface for printing.

14. The method of claim 11 wherein the buffer memory comprises a plurality of memory modules and the step of storing into the buffer memory includes the step of storing into an assigned memory module.

* * * * *